United States Patent [19]
Cretors

[11] Patent Number: 6,123,011
[45] Date of Patent: Sep. 26, 2000

[54] MOBILE WARMING BIN

[75] Inventor: Charles D. Cretors, Lake Forest, Ill.

[73] Assignee: C. Cretors and Company, Chicago, Ill.

[21] Appl. No.: 09/228,008

[22] Filed: Jan. 8, 1999

[51] Int. Cl.[7] .................................................. A23L 1/18
[52] U.S. Cl. ........................ 99/323.9; 99/323.11; D7/325
[58] Field of Search ............................... 99/323.5, 323.9, 99/323.11; D7/325; 34/88

[56] References Cited

U.S. PATENT DOCUMENTS

| | | | |
|---|---|---|---|
| 148,441 | 3/1874 | Gale | 99/323.5 |
| 2,900,045 | 8/1959 | Conklin et al. | 186/1 |
| 3,748,437 | 7/1973 | Keeshin et al. | 219/214 |
| 3,812,774 | 5/1974 | Day et al. | 99/323.8 |
| 3,887,253 | 6/1975 | Bridges et al. | 312/250 |
| 4,803,921 | 2/1989 | Nuss | 99/331 |
| 4,828,146 | 5/1989 | Stein | 222/1 |
| 5,711,208 | 1/1998 | Wood et al. | 99/323.5 |

*Primary Examiner*—Milton Cano
*Assistant Examiner*—Sherry A. Dauerman
*Attorney, Agent, or Firm*—Mayer, Brown & Platt

[57] ABSTRACT

A system for storing and dispensing popcorn comprising a popcorn popping apparatus and a bin for containing popcorn. The bin is removably positionable in the popcorn popping apparatus so that the popcorn that is popped can drop through an aperture in the popping apparatus into the bin. The bin itself is mobile, thereby enabling an operator to transport the bin from the popping apparatus to a receiving station or vice-versa. The popcorn in the bin can be dispensed directly therefrom or stored for later use. In a preferred embodiment of the present invention, the bin also contains a warming system that keeps the popcorn in the bin warm, fresh and crisp. The warming system is provided with power when it is placed in either the popping apparatus or the receiving station via electrical connectors located on the bin, popping apparatus and receiving station.

25 Claims, 8 Drawing Sheets

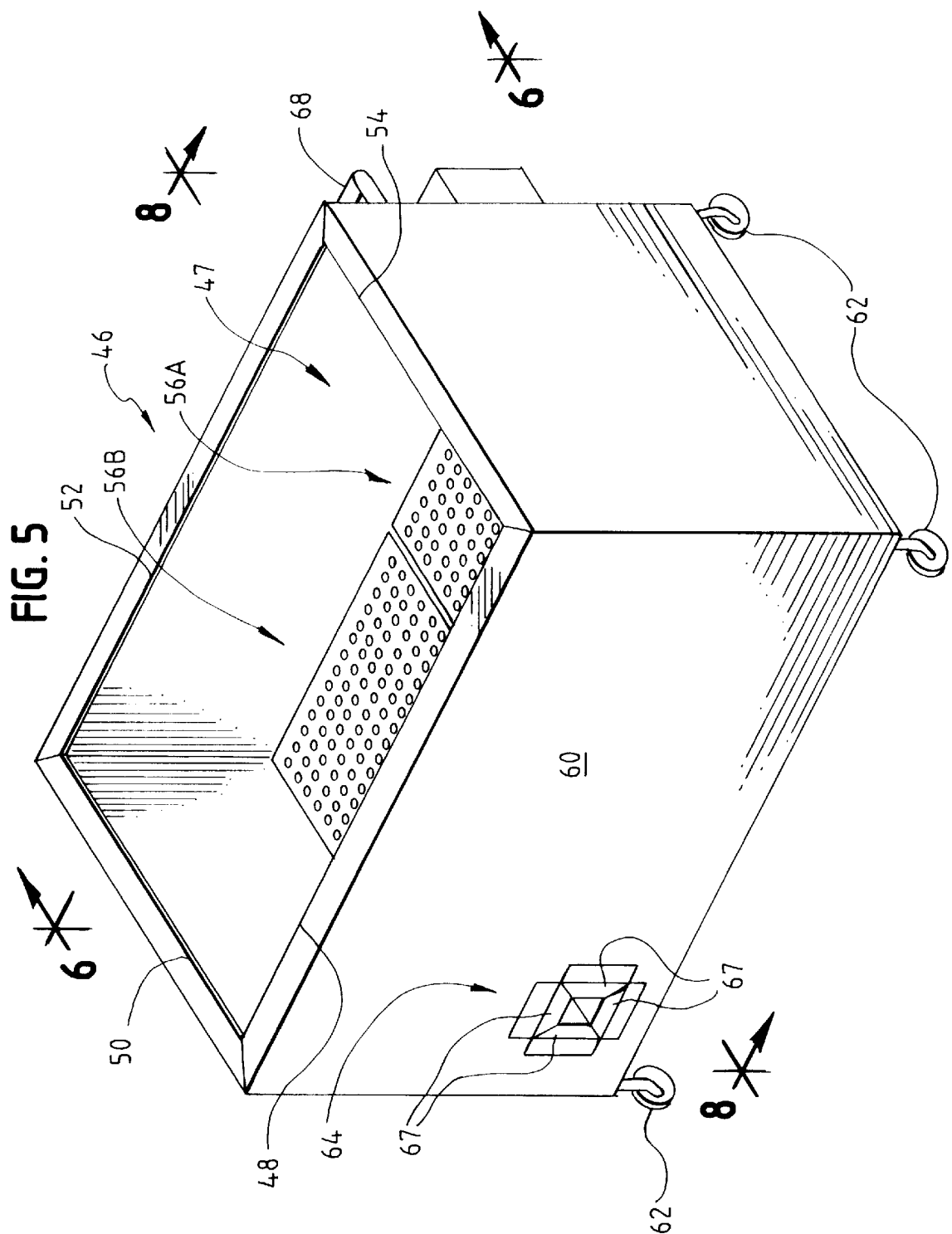

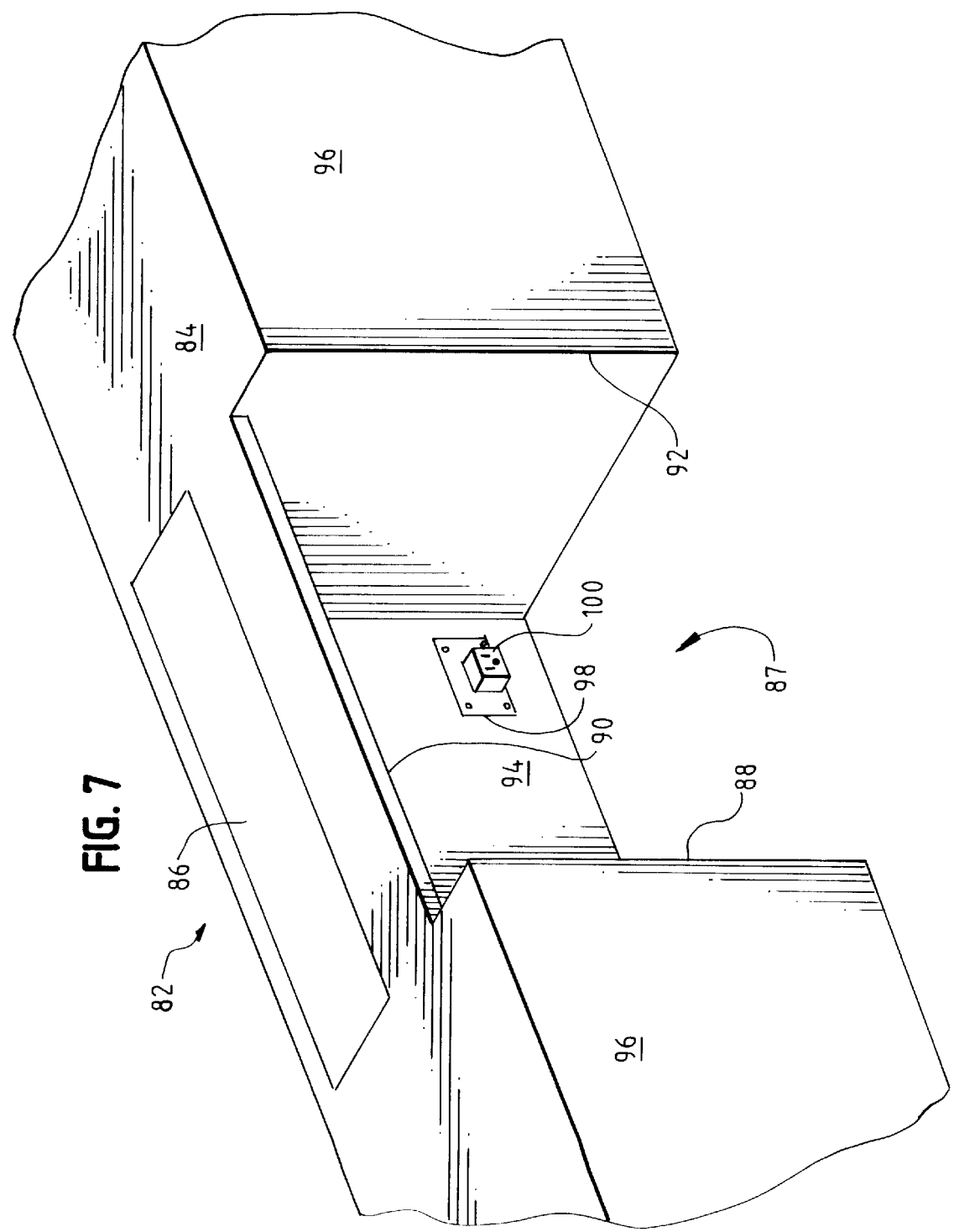

MOBILE WARMING BIN

FIELD OF INVENTION

This invention relates to a container for transporting food. More specifically, this invention relates to a mobile warmer bin which may be used to transport popcorn from a preparation appliance to a serving counter.

BACKGROUND OF INVENTION

Popcorn is a favorite snack at movies and other entertainment events. Due to its popularity, popcorn is often mass-produced in large stationary popcorn poppers where the popped popcorn is stored in a holding bin that is integral with the popcorn popper. Subsequently, the popcorn is transported to concession stands where it is purchased by consumers. These concession stands usually employ a warming device to keep the popcorn warm until it is dispensed. Traditionally, popcorn was transported from the popper to the concession stand by either placing the popcorn in plastic bags for storage and then transferring the popcorn from the plastic bag into the concession stand warmer, or by using large scoops to take the popcorn directly from the popper to the concession warmer.

When plastic bags are used to transport popcorn, lost sales may result if customers see the popcorn being removed from a plastic bag since they may believe that they are not being served fresh popcorn. Also, the process of placing the popcorn in a bag, moving it into storage and then to the concession stand breaks apart the popcorn kernels and reduces the volume available for sale to consumers. Since popcorn is sold volumetrically, any reduction in volume results in lost profit for the vendor. Additionally, the process of placing popcorn in bags results in the popcorn losing its freshness, crispness, and heat, thereby necessitating re-heating before the popcorn can be sold.

Using large scoops to transfer popcorn from a popper to a concession warmer also presents difficulties since the transfer is often performed when the concession area is busy, thus disrupting the efficient and smooth operation of the concession area. Additionally, because the scoops are large, they cannot be inserted underneath the popcorn in the popper, and must instead be pushed down through the popcorn. This also results in broken popcorn kernels which in turn, results in lost profits.

Furthermore, both the plastic bag and scoop techniques result in popcorn falling to the ground, thereby reducing the amount of popcorn available for sale and giving an unkept appearance to the concession area.

As a result, there is a need for an efficient system to transport popcorn from a preparation appliance to a serving area.

There is a further need for a device to reduce popcorn breakage during transportation from a stationary popcorn popper to a concession area.

There is also a need for a system to transport popcorn from a stationary popcorn popper to a concession area that is aesthetically pleasing to consumers.

Yet another need is for a system to transport popcorn from a stationary popcorn popper to a concession area that reduces the spillage of the popcorn.

There is also a need for a system to transport popcorn from a stationary popcorn popper to a concession area in an efficient manner so as not to disrupt concession area activities.

A still further need is for a mobile bin that can catch popcorn from a stationary popcorn popper, and then be transported to a concession area where the popcorn can be served to consumers directly from the same bin.

There is also a need for a mobile bin that includes a self-contained warming system for warming popcorn before it is dispensed to consumers.

Other needs will become apparent upon a further reading of the following detailed description taken in conjunction with the drawings.

SUMMARY OF THE INVENTION

In one form of the invention, the aforementioned needs are fulfilled by a system for storing and dispensing popcorn. This system comprises a popcorn popping apparatus and a bin for containing popcorn. The bin is removably positionable about the popcorn popping apparatus so that the popcorn that is popped can be transferred into the bin. The bin itself is transportable to a receiving station where the popcorn in the bin can be dispensed directly therefrom or stored for later use. In a preferred embodiment, the bin includes a warming system to keep the popcorn warm, fresh and crisp.

BRIEF DESCRIPTION OF THE DRAWINGS

FIG. 5 is a rear perspective view of a mobile bin.

FIG. 7 is a perspective view of a receiving station.

DETAILED DESCRIPTION OF THE PREFERRED EMBODIMENT

Figure 1:
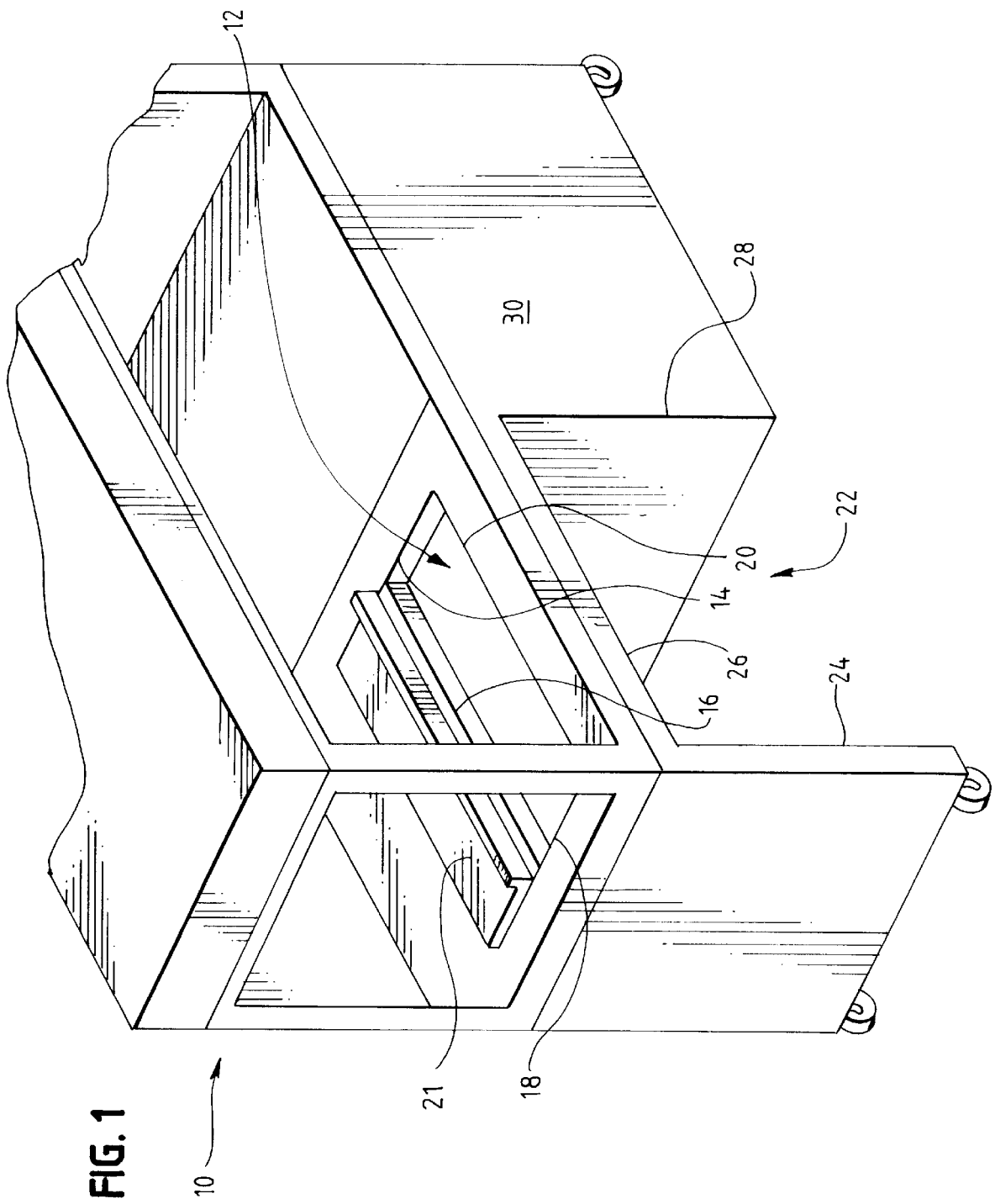
FIG. 1 is a perspective view of a popcorn popping apparatus.

While the present invention is capable of embodiment in various forms, there is shown in the drawings and will be hereinafter described a presently preferred embodiment with the understanding that the present disclosure is to be considered as an exemplification of the invention, and is not intended to limit the invention to the specific embodiment illustrated.

Figure 2:
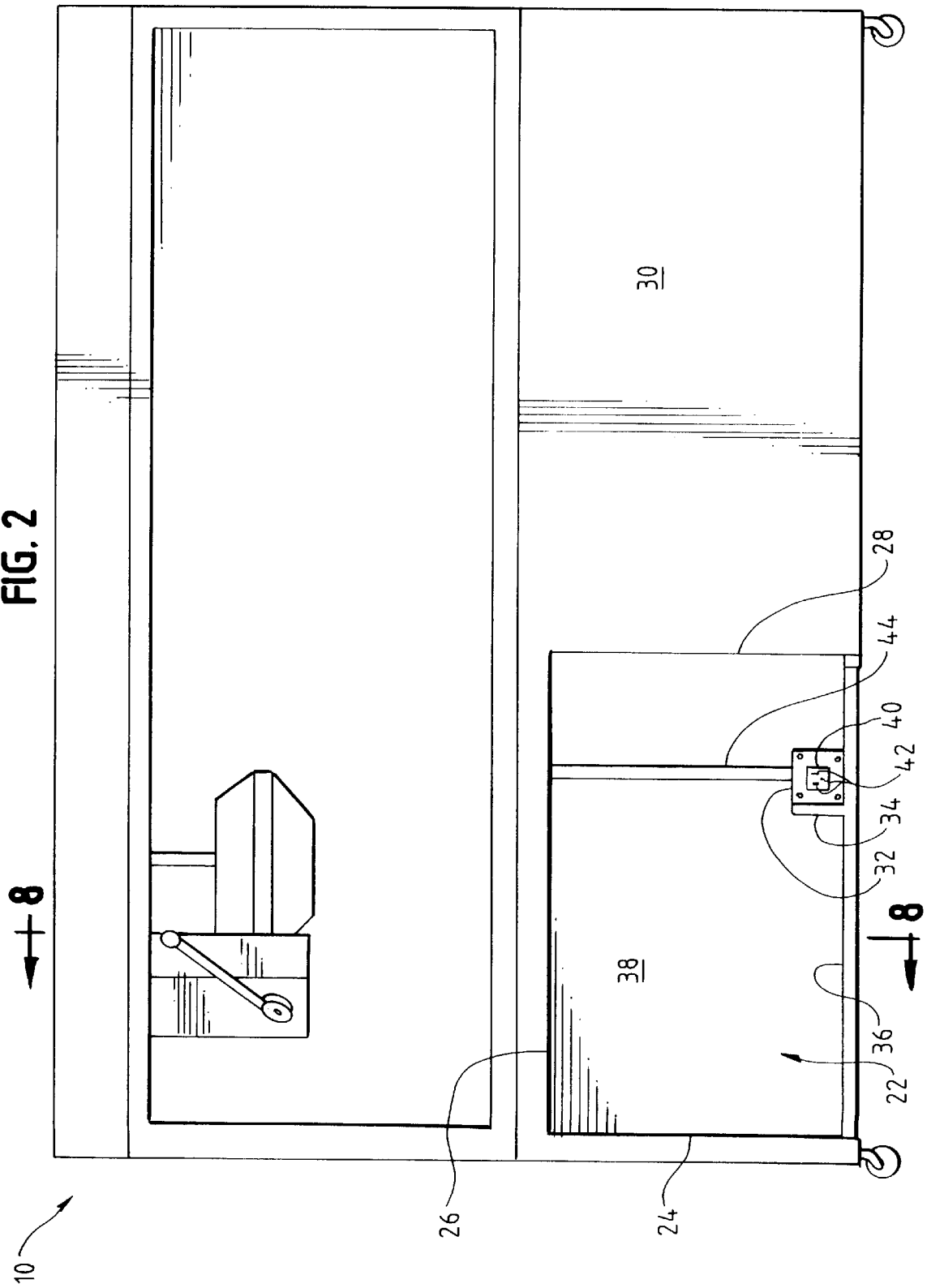
FIG. 2 is a front view of a popcorn popping apparatus.
Figure 3:
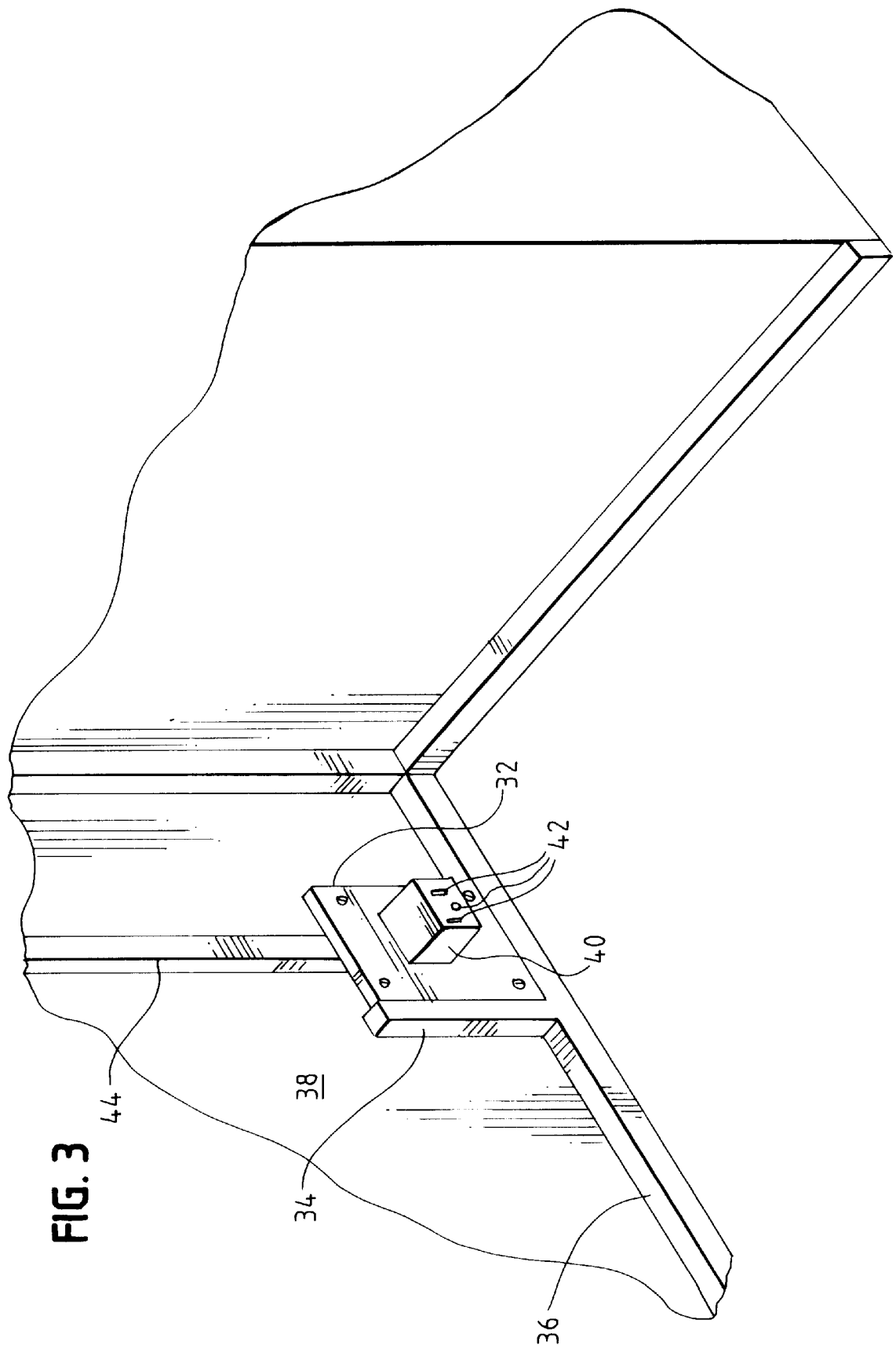
FIG. 3 a partial perspective view of an electrical connector on a popcorn popping apparatus.

Referring now to the drawings and more particularly to FIG. 1, the popcorn dispensing system includes a popcorn popping apparatus generally designated as reference numeral 10. The popping apparatus 10 includes an internal aperture 12 defined by edges 14, 16, 18 and 20. In a preferred embodiment, a sliding cover 21 is disposed above the aperture 12 so that it can slide over the aperture 12 to prevent any popcorn from falling to the floor. The popping apparatus 10 also has a front panel 30 and a front opening 22 defined by edges 24, 26 and 28. As may be observed in FIGS. 2 and 3, the popping apparatus includes a base 32 attached to support members 34 and 36 and to a back wall 38. Attached to the base 32 is an electrical connector 40 which protrudes perpendicularly from the base 32. The electrical connector 40 includes a plurality of sockets 42. Electrical wiring is connected to the sockets 42 through an electrical conduit 44.

Figure 4:
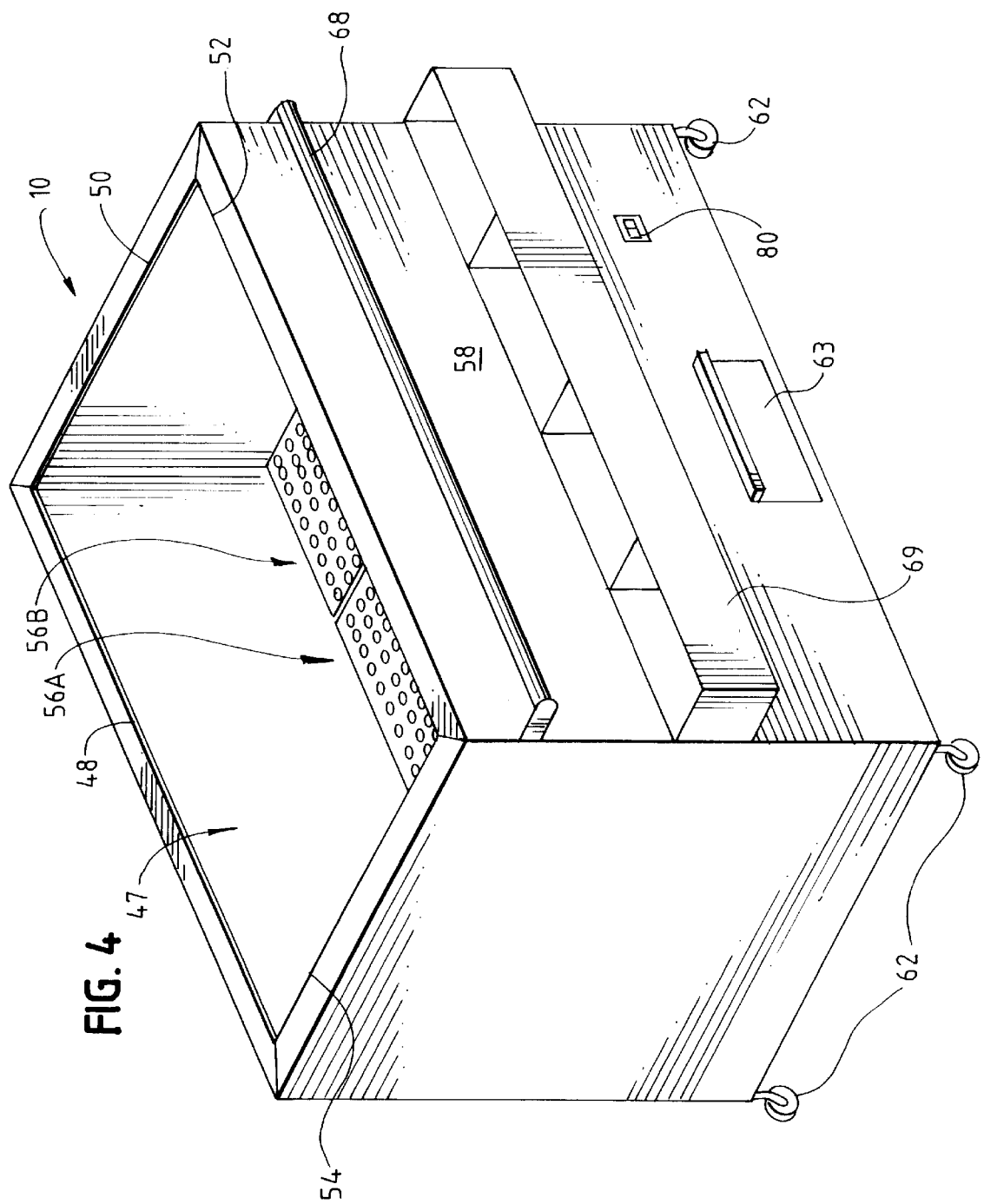
FIG. 4 is a front perspective view of a mobile bin.
Figure 5A:
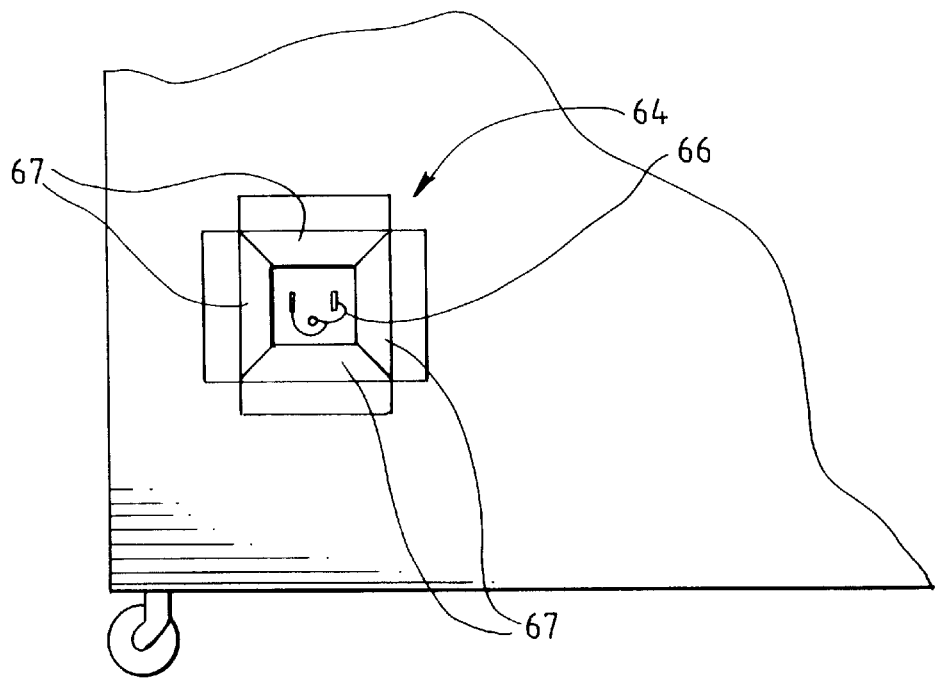
FIG. 5A is a partial rear view of a mobile bin showing an electrical connector.
Figure 6:
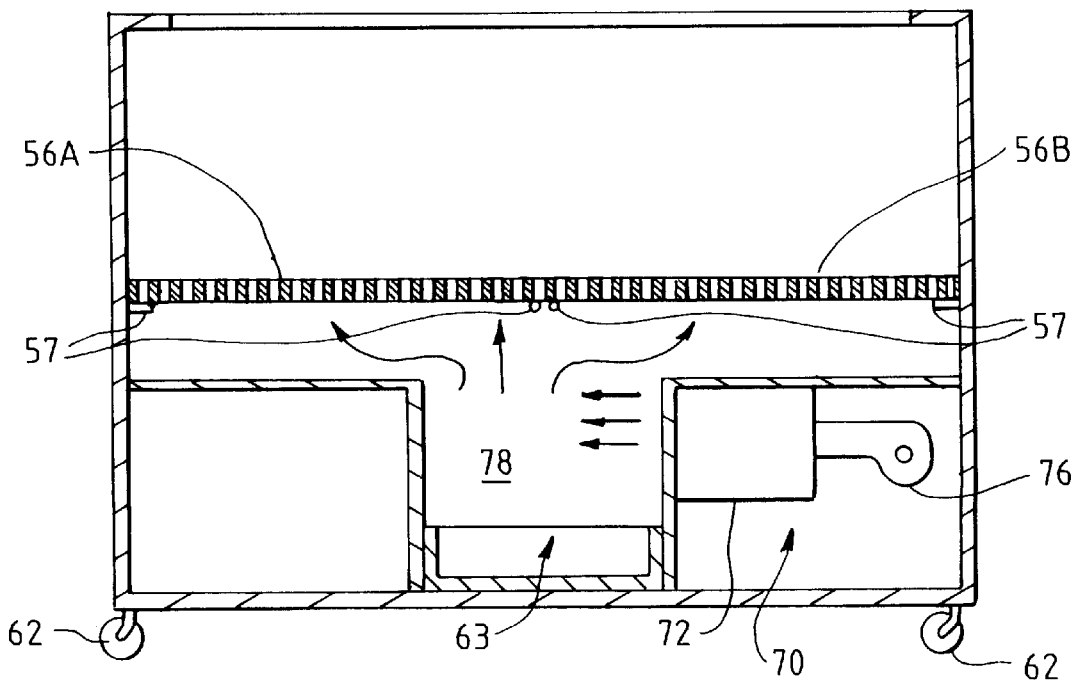
FIG. 6 is a cross-sectional view of a bin taken along 6—6 of FIG. 5 showing an internal warming system of a mobile bin.

A bin 46, as seen in FIGS. 4, 5 and 6, has a cavity 47 for containing popcorn defined by edges 48, 50, 52 and 54 and removable perforated bottom segments 56A and 56B. Removable perforated bottom segments 56A and 56B rest on pins 57 so as to enable an operator to lift the segments 56A and 56B out of the bin 46 in order to clean the interior of the bin 46. The bin 46 also has a front side 58 and a back side 60. Rotatably mounted wheels 62 are disposed beneath the bin 46 and are preferably located at each lower corner of the bin 46. The caster-like operation of the wheels 62 allows for an operator to easily maneuver the bin 46 to and from the popping apparatus 10. A removable clean out tray 63 is accessible from the front side 58 of the bin 46 and is located proximate the bottom of the bin 46 so as to catch any unpopped popcorn kernels or popped popcorn fragments that fall through the removable perforated bottom segments 56A and 56B.

The bin 46 also includes means for connecting to an external power source such as the electrical connector 64 which is located on the back side 60 as shown in FIGS. 5 and 5A. The electrical connector 64 includes a plurality of plugs 66 which are inset from the back side 60 so that the plugs 66 do not cross the plane of the back side 60 of the bin 46. Tapered portions 67 surround the plugs 66 to force alignment when connecting to any external power source. Preferably, the bin 46 also includes a popcorn bag holder 69 and a handle 68 mounted on the front side 58 to facilitate transporting the bin 46.

Figure 8A:
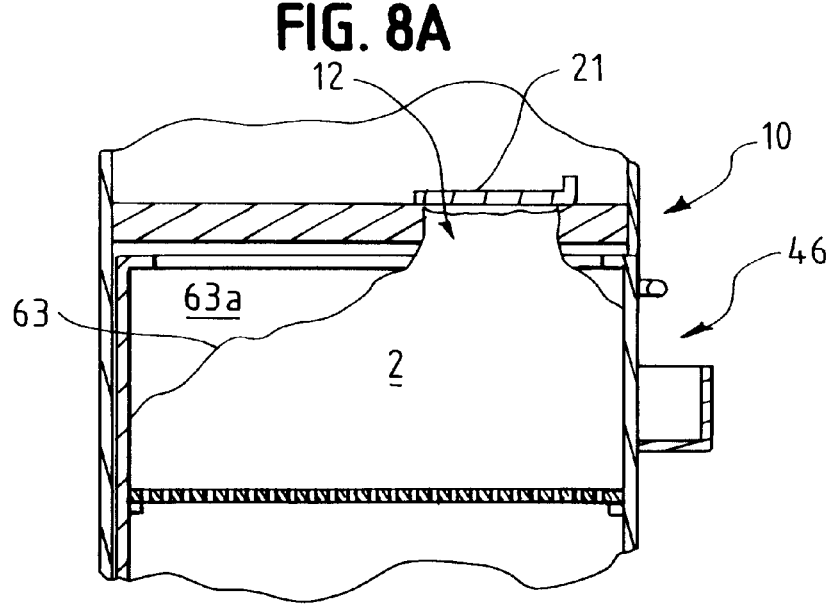
FIG. 8A is a partial cross-sectional view taken along 8—8 of FIG. 2 of a popping apparatus with a cross-sectional view taken along 8—8 of FIG. 5 of a bin placed inside of the popping apparatus.
Figure 8B:
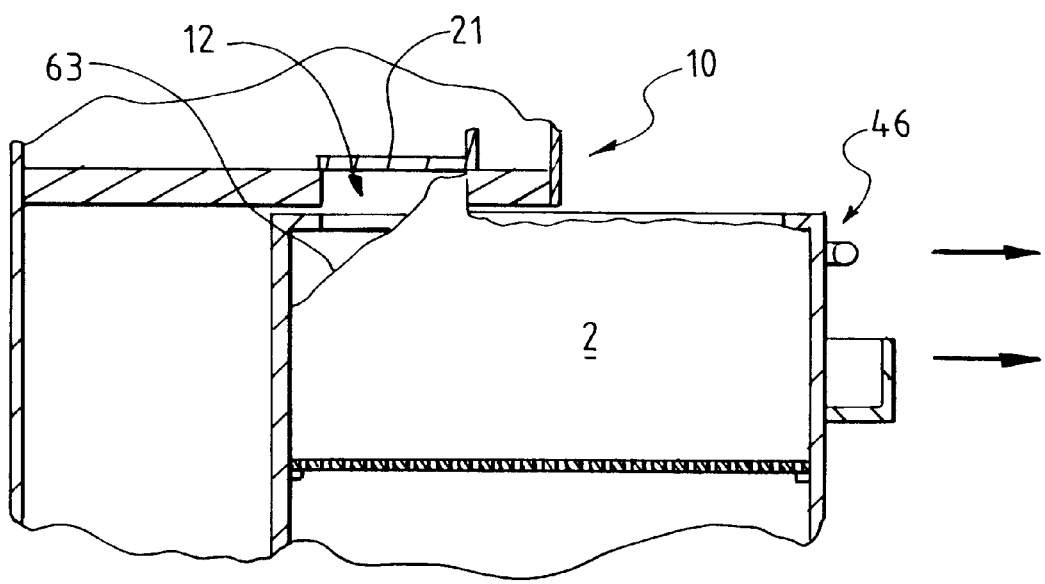
FIG. 8B is a partial cross-sectional view taken along 8—8 of FIG. 2 of a popping apparatus with a cross sectional view taken along 8—8 of FIG. 5 of a bin partially removed from the popping apparatus.

In a preferred embodiment, the dimensions of the bin 46 are such that it may be inserted fully into the popping apparatus 10 through the opening 22, so that upon full insertion of the bin 46, the front face 58 of the bin 46 is flush with the front face 30 of the popping apparatus 10. Additionally, upon insertion, the cavity 47 of the bin 46 is disposed beneath the aperture 12. It should be appreciated that the cavity 47 of the bin 46 is wider and longer than aperture 12 so that bin 46 catches all of the popcorn produced by the popping apparatus 10 without any popcorn falling to the ground. As can be seen in FIGS. 8A and 8B, when the popcorn 2 falls through aperture 12, the popcorn 2 piles upon itself and creates a natural angle of repose 63, which leaves a void 63A in the bin 46. When the cover 21 is closed and the bin 46 is removed from the popping apparatus, the remaining popcorn trapped between the cover 21 and the bin 46 fills the void 63A created by the natural angle of repose 63 of the popcorn 2.

Furthermore, the dimensions of the bin 46 are large enough so as not to allow for excessive movement between the bin 46 and the opening 22 when the bin 46 is placed inside of the popping apparatus 10. This allows for correct alignment and mating of the electrical connectors 40 and 64 when the bin 46 is placed inside of popping apparatus 10. It should also be appreciated that the relatively large dimensions and configuration of the electrical connectors 40 and 64 allows for easy alignment and mating of the electrical connectors upon insertion of the bin 46 into the popping apparatus 10. The tapered portions 67 also facilitate the mating of the electrical connectors 40 and 64 by forcing the electrical connectors 40 and 64 into alignment prior to the plugs 66 and sockets 42 making contact.

A forced-air warming system generally designated as reference numeral 70 in FIG. 6 is enclosed within the bin 46 to keep the popcorn warm. The warming system 70 is provided with power when the electrical connectors 40 and 64 are mated. The warming system 70 includes a heating box 72 and a blower 76. Inside of the heater box 72 there is a coiled tubular heating element (not shown) and a thermostat (not shown). The blower 76 forces air into the heating box 72 and over the heating element, whereby heat from the heating element is transferred to the passing air, thereby warming it. The thermostat regulates the temperature of the heating element to ensure that the heating element does not overheat and to maintain the popcorn in the bin 46 at a desired temperature. Warm air produced by the blower 76 and heating box 72 is in turn forced into the heated air plenum 78 of the bin 46. The warm air then passes through the removable perforated bottom segments 56A and 56B to come in contact with the popcorn, thereby warming the popcorn to keep it warm, fresh and crisp. A power switch 80 is located on the front side 58 of the bin 46 which operates to enable or disable the warming system. The bin 46 may also include a self-contained lighting system (not shown) to illuminate the popcorn in the bin 46, so as to allow consumers to easily view the popcorn when the bin is transferred to a serving or concession area.

The popcorn dispensing system also includes a receiving station 82 as shown in FIG. 7. In a preferred embodiment, the receiving station 82 is integral with a serving counter 84 and a viewing window 86. However, it is within the scope of the present invention that the bin 46 may act as a stand-alone serving counter with the addition of a cover (not shown) to the top of bin 46 which includes a shelf and movable serving door. In this configuration, the bin may also include a clear viewing window (not shown) on its backside 60 to display the popcorn.

The receiving station 82 has a back panel 94, a front face 96 and an opening 87 defined by edges 88, 90 and 92. The back panel 94 includes a base 98 to which a protruding electrical connector 100 is attached. As can be appreciated, the protruding electrical connector 100 on the back panel 94 of the receiving station 82 is identical to the protruding electrical connector 40 on the back panel 38 of the popping apparatus 10. It should be understood that it is within the scope of the present invention that the receiving station can take the form of any other remote location that contains an electrical connector similar to electrical connectors 40 and 100, and that the present invention can embody a plurality of such receiving stations.

Just as with opening 22 of the popping apparatus 10, the dimensions of the opening 87 of the receiving station 82 are such that upon insertion of the bin 46 into the receiving station 82, there will be a minimal amount of movement between the opening 87 and the bin 46 so as to allow for the alignment and mating of the electrical connectors 64 and 100. Also, the depth of the receiving station 82 is such that upon full insertion of the bin 46, the front face 58 of the bin 46 shall be flush with the front face 96 of the receiving station 82.

As those skilled in the art will readily understand, operation of the present invention is easily accomplished by placing the bin 46 into the popping apparatus 10 so as to releasably mate the electrical connectors 40 and 64 and supply power to the warming system 70 which warms the bin 46 in preparation for receiving popcorn. It should be appreciated, though, that the bin 46 does not necessarily have to be placed inside of the popping apparatus 10. Rather, the bin 46 can be placed anywhere around the popping apparatus 10 so as to allow popcorn from the popping apparatus 10 to be easily transferred into the bin 46.

After the bin 46 is placed within the popping apparatus 10, the popping apparatus 10 then pops popcorn which is directly dropped through aperture 12 into the cavity 47 of bin 46 without any operator assistance. However, it is within the scope of the present invention that any other means for placing the popcorn in the bin 46 such as manually pushing the popcorn into the bin or employing an electro-mechanical pusher device is acceptable. Once the bin 46 is full with popcorn, an operator may slide the cover 21 over the aperture 12 so that no popcorn falls to the ground, and then pull the bin 46 out of the popping apparatus 10, thereby disconnecting the electrical connectors 40 and 64 in the process. As stated earlier, when the bin 46 is removed from the popping apparatus 10, the popcorn trapped between the cover 21 and the bin 46 fills the void 63A created by the natural angle of repose 63 of the popcorn 2.

After the bin 46 is removed from the popping apparatus 10, the bin 46 may then be transported to a receiving station 82 at a serving counter 84 or a remote receiving station (not shown) to store the popcorn until needed. As explained above, the remote receiving station will also contain an electrical connector that can releasably mate with the electrical connector 64 on the bin 46 in order to enable the warming system 70.

When an operator places the bin 46 into the receiving station 82, power is again established to the warming system 70 through connectors 64 and 100 so as to keep the popcorn warm, fresh and crisp until it is dispensed to consumers. When all of the popcorn, or a substantial amount of the popcorn, is dispensed from the cavity 47 of bin 46, the bin 46 can then be removed from the receiving station 82 and placed back into the popping apparatus 10 to be filled once again with popcorn.

It is within the scope of the present invention that the popcorn popping system can be used with a plurality of bins so that a steady flow of fresh, crisp popcorn can be provided to a serving counter and in turn be dispensed to consumers. For example, when a bin is removed from the popping apparatus full of popcorn, another empty bin can immediately be placed into the popping apparatus to be filled with popcorn. Similarly, when a bin becomes empty at a serving counter receiving station it can be removed and then be immediately replaced with another bin full of popcorn. With this process, a concession area may be continually stocked with popcorn without disrupting the smooth and efficient flow of the concession area. Additionally, since concession operators will no longer have to transfer popcorn from the popcorn popping apparatus to a concession warmer or other dispensing bin, there will be a minimal amount of spillage and breakage of the popcorn kernels, thus providing a greater volume of popcorn available for consumer consumption and hence, more profits.

Thus, as can be appreciated from the preceding detailed description, the preferred embodiment of the present invention provides a system for transporting popcorn from a popcorn popper to a serving counter. This system provides a mobile warmer bin that may be removably placed inside of a popper so as to catch popcorn as it is popped with minimal spillage and without any operator assistance. Subsequently, the bin may be brought to a serving area, where popcorn may be dispensed directly from the bin. This system decreases the amount of handling previously needed, thus resulting in less broken popcorn, which in turn results in more profit for the operator. The bin is mobile and easily maneuverable, allowing for fresh, crisp popcorn to be transported to a concession area without disrupting its efficient and smooth operation. Therefore, the mobility and design of the present invention provides a novel design which fills a need heretofore not provided for.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A system for storing and dispensing popcorn, said system comprising:

a popcorn popping apparatus for producing popcorn, said apparatus having an opening;

a removably positionable bin which is insertable into said opening of said popcorn popping apparatus and wherein said bin catches said popcorn produced from said popping apparatus;

a plurality of wheels coupled to said bin, wherein said wheels allow said bin to be transported to another location.

2. The system of claim 1, wherein said system further comprises a receiving station, wherein said bin is removably positionable about said receiving station, and wherein said receiving station is situated at a different location from said popping apparatus.

3. The system of claim 2, wherein said receiving station is integral with a counter top.

4. The system of claim 3, wherein said counter top is a serving counter.

5. The system of claim 4, wherein said serving counter includes a clear plate allowing said popcorn in said bin to be viewed.

6. The system of claim 1, wherein said bin includes a warming system.

7. The system of claim 6, wherein said system further comprises a connector on said popping apparatus and a connector on said bin, said connectors providing a releasable electrical connection between said popping apparatus and said bin to provide power to said warming system.

8. The system of claim 7, wherein said connectors are in a plug and socket configuration.

9. The system of claim 6, wherein said warming system includes a blower.

10. The system of claim 2, wherein said system further comprises a connector on said receiving station and a connector on said bin, said connectors providing a releasable electrical connection between said receiving station and said bin to power a warming system in said bin.

11. The system of claim 10, wherein said connectors are in a plug and socket configuration.

12. A process for dispensing popcorn, said process comprising:

inserting a removably positionable bin within a popcorn popping apparatus;

popping popcorn in said popcorn popping apparatus;

catching said popcorn in said removably posistionable bin wherein said bin has a plurality of wheels;

removing said bin from the popcorn popping apparatus;

transporting said bin to a receiving station;

dispensing said popcorn directly from said bin.

13. The process of claim 12, further comprising warming said popcorn while in said bin.

14. A system of storing and dispensing popcorn, said system comprising:
- a popcorn popping apparatus for producing popcorn;
- a bin for containing popcorn; said bin being removably positionable inside of said popping apparatus;
- an aperture in said popping apparatus located above said bin so as to allow for said popcorn to fall through said aperture into said bin;
- a plurality of wheels coupled to said bin, wherein said wheels allow said bin to be transported to another location.

15. The system according to claim 14, wherein said system further comprises an electrical connector on said popping apparatus and an electrical connector on said bin wherein said electrical connectors are releasably matable to form an electrical connection.

16. The system according to claim 15, wherein said electrical connection powers a forced air warming system in said bin to warm said popcorn.

17. The system according to claim 16, further comprising a receiving station situated at a different location than said popcorn popping apparatus.

18. The system according to claim 17, further comprising an electrical connector on said receiving station that is releasably matable with said electrical connector on said bin to form an electrical connection to power said warming system.

19. The system according to claim 18, wherein said receiving station is integral with a counter top.

20. The system according to claim 19, wherein said counter top is a serving counter.

21. A mobile bin for transporting popcorn, said bind comprising:
- a cavity in said bin for holding said popcorn;
- a plurality of wheels coupled to said bin for transporting said bin from a popcorn preparation appliance to a receiving station; and
- an electrical connector on said bin that is releasably matable with an electrical connector on said preparation appliance to form an electrical connection.

22. The bin according to claim 21, further comprising an electrical connector on said receiving station that is releasably matable with said electrical connector on said bin to form an electrical connection.

23. The bin according to claim 22, further comprising a warming system that is operatively connected to said electrical connector on said bin.

24. The bin according to claim 23, wherein said preparation appliance is a popcorn popping apparatus.

25. The bin according to claim 24, wherein said receiving station is a serving counter.

* * * * *

UNITED STATES PATENT AND TRADEMARK OFFICE
CERTIFICATE OF CORRECTION

PATENT NO : 6,123,011
DATED : September 26, 2000
INVENTOR(S): Charles D. Cretors It is certified that error appears in the above-identified patent and that said Letters Patent is hereby corrected as shown below:

Column 6, line 62, change "posistionable" to -- positionable --.

Column 8, line 5, change "bind" to -- bin --.

Signed and Sealed this

Twenty-second Day of May, 2001

Attest:

NICHOLAS P. GODICI

Attesting Officer    Acting Director of the United States Patent and Trademark Office